United States Patent [19]

Hunter

[11] Patent Number: 4,657,064
[45] Date of Patent: Apr. 14, 1987

[54] ADJUSTABLE GUIDE SLIPPERS FOR MATCHPLATE MOLDING MACHINE

[75] Inventor: William A. Hunter, Inverness, Ill.

[73] Assignee: Hunter Automated Machinery Corporation, Schaumburg, Ill.

[21] Appl. No.: 776,099

[22] Filed: Sep. 16, 1985

Related U.S. Application Data

[63] Continuation of Ser. No. 685,166, Dec. 21, 1984, abandoned.

[51] Int. Cl.[4] .................. B22C 17/00; B22C 21/10
[52] U.S. Cl. .................................. 164/169; 164/182; 164/183; 164/187; 164/188; 164/412; 425/423; 425/431; 384/38; 384/40
[58] Field of Search ............... 164/169, 182, 183, 187, 164/188, 412, 37, 44, 388; 425/412, 414, 423, 425, 431; 384/38, 40

[56] References Cited

U.S. PATENT DOCUMENTS

| | | | |
|---|---|---|---|
| 1,561,500 | 11/1925 | Wood | 164/182 X |
| 3,229,336 | 1/1966 | Hunter et al. | 164/182 X |
| 3,342,253 | 9/1967 | Hunter | 164/374 |
| 3,406,738 | 10/1968 | Hunter | 164/182 |
| 3,506,058 | 4/1970 | Hunter | 164/37 |
| 3,516,475 | 6/1970 | Dougherty | 164/37 |
| 3,519,058 | 7/1970 | Young | 164/187 X |
| 3,550,670 | 12/1970 | Greenwald | 164/37 |
| 3,556,196 | 1/1971 | Buhler | 164/182 X |
| 3,589,434 | 6/1971 | Kleinbagauer et al. | 164/182 |
| 3,648,759 | 3/1972 | Lund et al. | 164/182 |
| 3,824,060 | 7/1974 | Helmvich et al. | 425/425 |
| 4,108,234 | 8/1978 | Shine | 164/182 X |
| 4,114,677 | 9/1978 | Wernli | 164/183 X |
| 4,463,794 | 8/1984 | Shioda | 164/182 |

FOREIGN PATENT DOCUMENTS

| | | | |
|---|---|---|---|
| 2209977 | 9/1973 | Fed. Rep. of Germany | 384/40 |
| 57-16545 | 1/1982 | Japan | 384/40 |
| 557212 | 6/1977 | U.S.S.R. | 384/38 |

Primary Examiner—Nicholas P. Godici
Assistant Examiner—Samuel M. Heinrich
Attorney, Agent, or Firm—Leydig, Voit & Mayer

[57] ABSTRACT

The cope flask and drag platen of a matchplate molding machine are supported for up and down movement on vertical guide rails by sliding bearings or slippers located adjacent to corners of the flask and the platen. Each slipper includes a mounting block and a separate bearing pad connected to the mounting block by screws which may be independently adjusted to establish uniform face-to-face contact between the bearing pad and the rail. The screws also may be quickly released to enable removal and replacement of the bearing pad without disturbing the position of the mounting block.

12 Claims, 9 Drawing Figures

ADJUSTABLE GUIDE SLIPPERS FOR MATCHPLATE MOLDING MACHINE

This application is a continuation of application Ser. No. 685,166, filed 12/21/84, now abandoned.

BACKGROUND OF THE INVENTION

The present invention relates generally to a matchplate molding machine of the type in which a vertically movable platen actuated by a hydraulic ram moves a drag flask upwardly into engagement with a cope flask and then pushes both flasks upwardly against a pressing head to compact the molding sand in the two flasks. A molding machine of this general type is disclosed in Hunter U.S. Pat. No. 3,342,253 and Hunter U.S. Pat. No. 3,506,058.

As disclosed in U.S. Pat. No. 3,342,253, rollers are located at the corners of the cope flask and ride on vertically extending rails which guide and support the cope flask during its vertical movement. It is conventional to have a pair of rollers at each of the eight corners of the box-like flask with the rollers of each pair engaging opposite sides of the rail to provide a very stable guiding structure. The rollers usually are supported on eccentric mounting shafts to enable the rollers of each pair to be adjusted for interchangeability with different machines.

In some machines, the vertically movable platen also is guided by rollers which ride along the rails. One roller is mounted at each of the four corners of the platen and engages one side of the rail to guide and stabilize the platen while still allowing the platen some freedom of lateral movement.

During operation of the machine, the flasks are vibrated to cause the sand to settle in the flasks. Because of the vibration and other factors, the rollers and rails wear, and grooves ultimately are formed in the rails.

To reduce wear and the need for frequent replacement of the rails, it recently has been proposed to retrofit the machines with sliding bearings or "slippers" which replace the conventionally-used rollers, the slippers being attached to the existing roller mounting shafts. While such slippers do in fact reduce wear of the rails, it is difficult to adjust the presently available slippers into proper sliding contact with the rails and to maintain such contact as the slippers wear. When the slippers themselves ultimately wear out, it is a very tedious and time-consuming task to remove the worn slippers and to install and properly adjust new slippers.

SUMMARY OF THE INVENTION

The general aim of the present invention is to provide new and improved bearing slippers for use in a matchplate molding machine, the slippers being characterized particularly by their ability to be adjusted quickly and easily into face-to-face contact with the rails and by the ease with which the slippers may be installed and replaced.

A more detailed object of the invention is to achieve the foregoing by providing a unique slipper made of two members, namely, a mounting member and a bearing pad member. The pad is connected to the mounting member by fasteners which not only may be independently adjusted to press the pad into proper face-to-face contact with the rail but which also may be quickly released from the pad to enable fast and easy replacement of the low-cost pad without disturbing the position of the mounting member.

The invention also resides in the relatively simple construction of the two-piece slippers and in the use of such slippers both on the flasks and on the platen of the matchplate molding machine.

A further object of the invention is to provide an improved bearing slipper which maintains full contact with the rail at all times.

These and other objects and advantages of the invention will become more apparent from the following detailed description when taken in conjunction with the accompanying drawings.

DETAILED DESCRIPTION OF THE PREFERRED EMBODIMENT

For purposes of illustration, the invention is shown in conjunction with a matchplate molding machine 10 for making green sand molds 11. An overall machine of this general type is disclosed in the above-identified Hunter patents, the disclosures of which are incorporated herein by reference.

Figure 1:
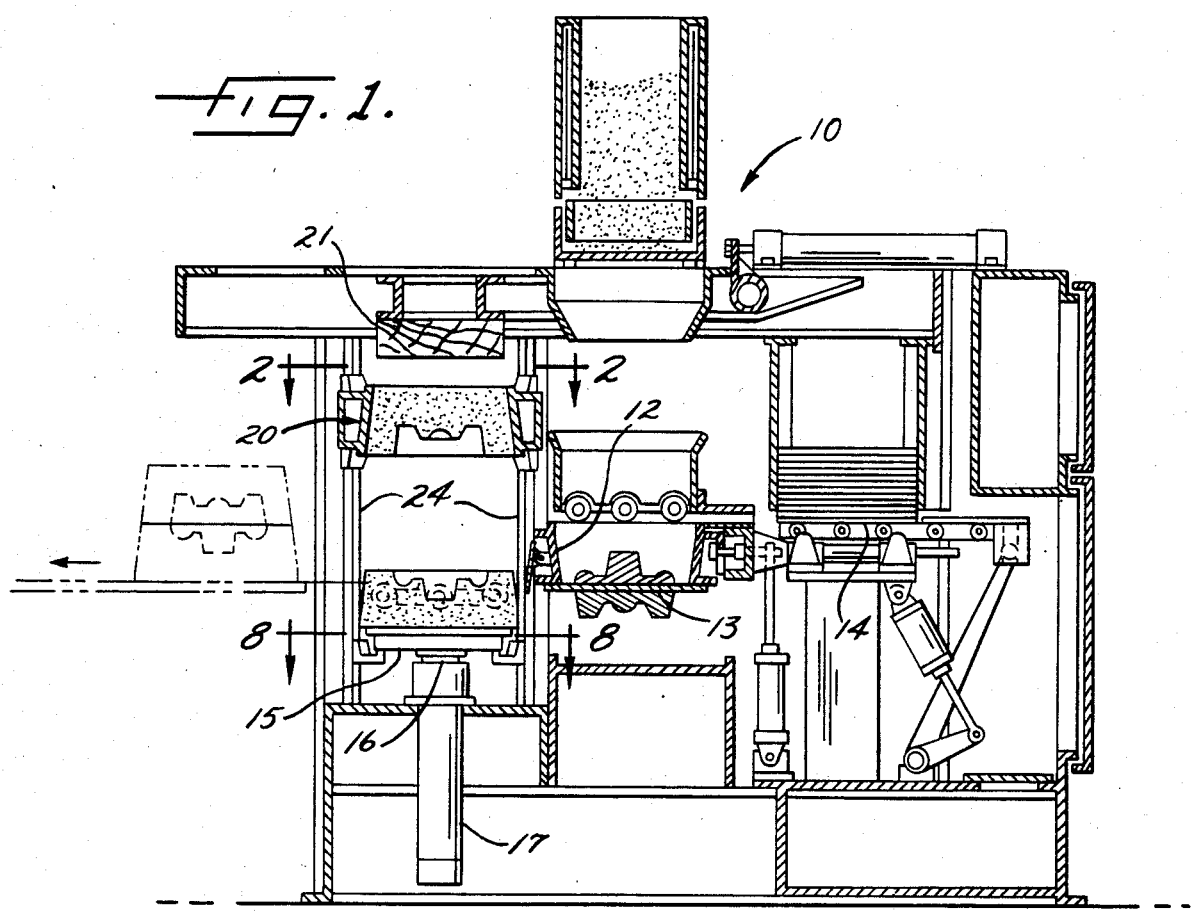
FIG. 1 is a front elevational view, partly in section, and showing in a somewhat schematic manner a typical matchplate molding machine equipped with new and improved slippers incorporating the unique features of the present invention.

An understanding of the construction and operation of the overall molding machine 10 is not necessary to an understanding of the present invention. It will suffice to say that a drag flask 12 with a matchplate 13 is filled with sand while the flask is positioned as shown in FIG. 1. After being covered by a bottom board 14 and inverted, the filled drag flask is shifted horizontally onto a platen 15 carried on the vertically movable ram 16 of a hydraulic actuator 17. When the ram is extended upwardly, the matchplate 13 on the drag flask 12 closes the bottom of a cope flask 20, the latter than being filled with sand. Thereafter, the ram is extended further to shift both flasks upwardly in unison and to cause a pressing head 21 to compact the sand in the flasks. Following compaction, the ram is retracted to lower the flasks until the cope flask 20 is stopped in the position illustrated in FIG. 1. by fixed stops (not shown). The remaining steps of the mold-making operation may be ascertained from the Hunter '058 patent.

Extending between the actuator 17 and the pressing head 21 are four vertical frame members 24 spaced from one another and located at the corners of an imaginary rectangle. Each frame member faces diagonally of the rectangle and supports a vertically extending rail 25

Figure 2:
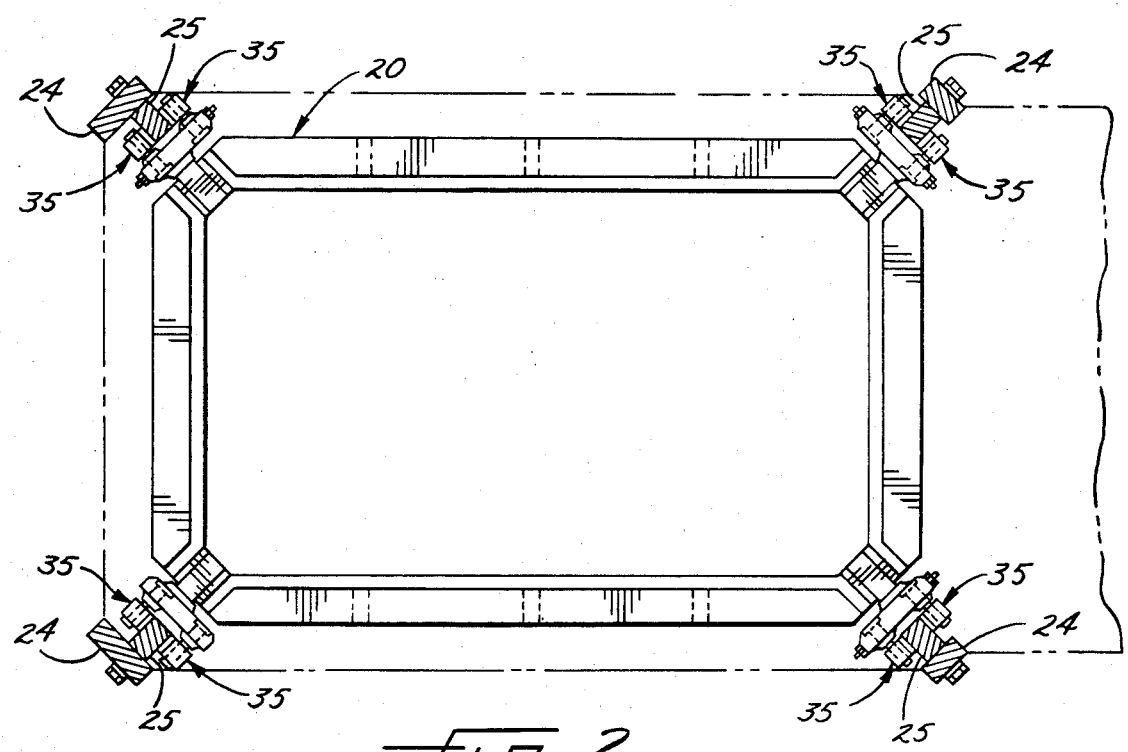
FIG. 2 is an enlarged fragmentary cross-section taken substantially along the line 2—2 of FIG. 1.
Figure 3:
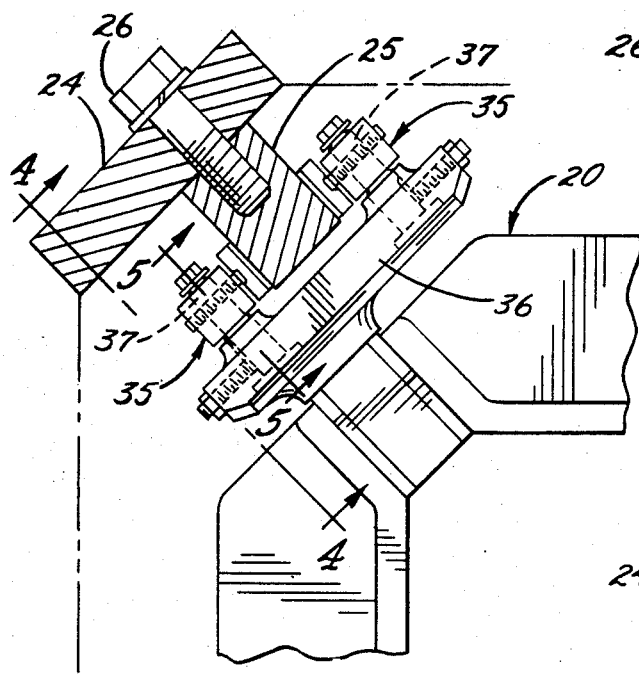
FIG. 3 is an enlarged view of certain parts shown in FIG. 2.
Figure 4:
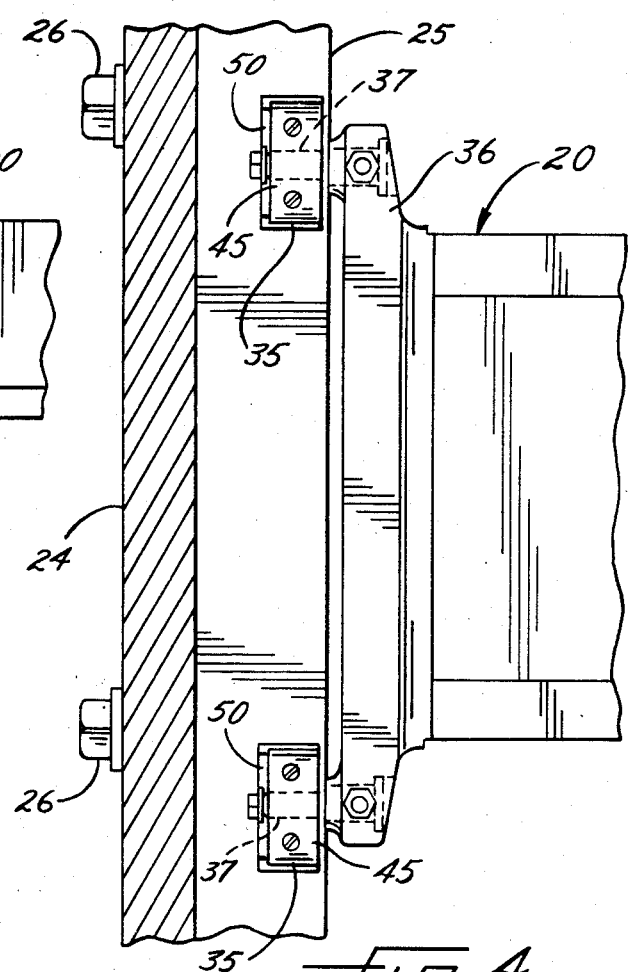
FIG. 4 is a fragmentary cross-section taken substantially along the line 4—4 of FIG. 3.
Figure 8:
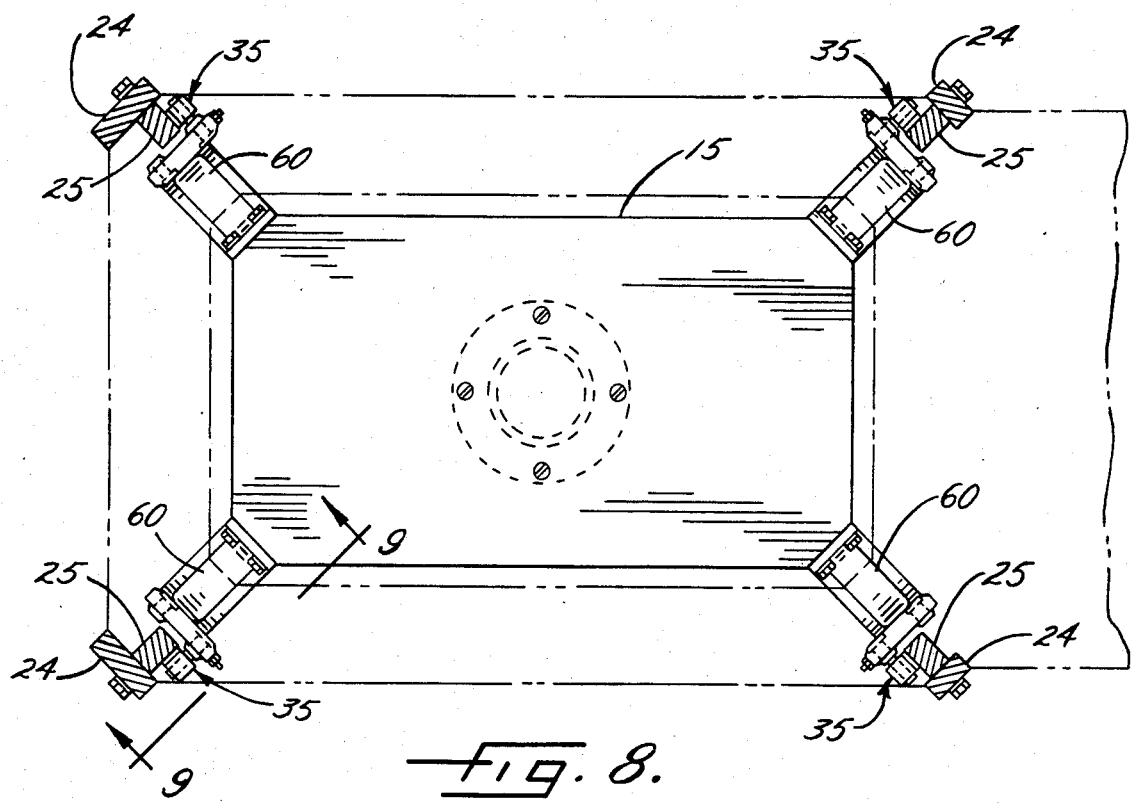
FIG. 8 is an enlarged fragmentary cross-section taken substantially along the line 8—8 of FIG. 1.
Figure 9:
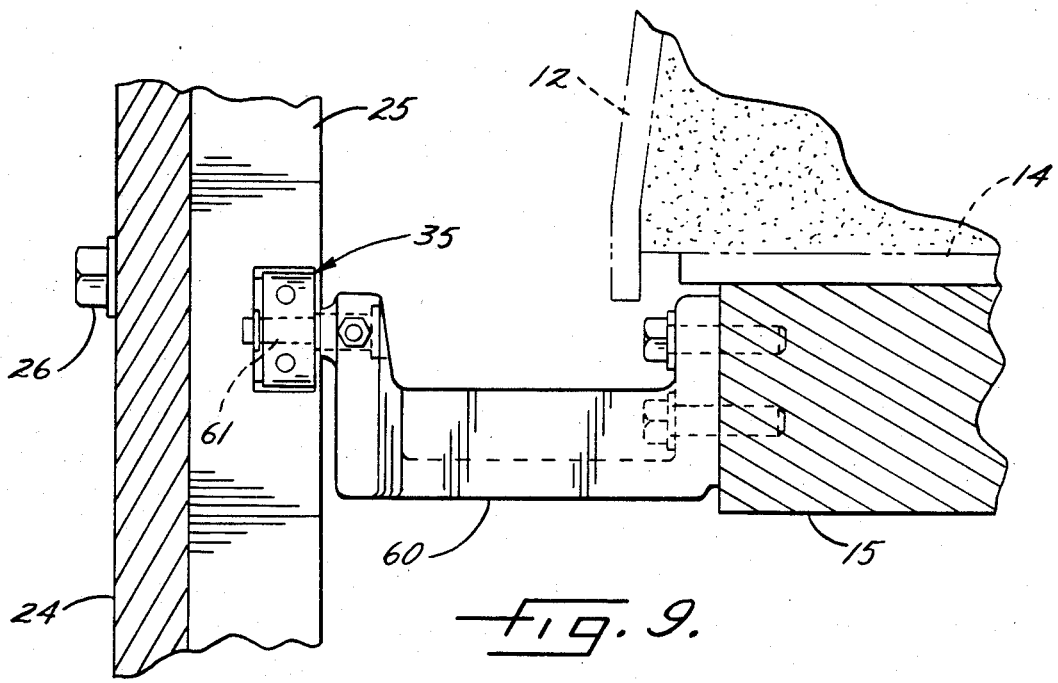
FIG. 9 is an enlarged fragmentary cross-section taken substantially along the line 9—9 of FIG. 8.

(FIGS. 2, 3, 8, and 9), the rail being fastened to the frame member by screws 26 (FIGS. 3 and 9). The rails serve to guide and support the cope flask 20 as the latter is forced upwardly toward and then is moved downwardly away from the pressing head 21. As is apparent from FIGS. 2 and 4, the cope flask is generally box-like in construction and its eight mitered corners are located adjacent the guide rails.

To mount the cope flask 20 for up and down sliding on the rails 25, two sliding bearings or so-called slippers 35 are associated with each of the eight corners of the cope flask. One slipper 35 of each pair slides against one side of the adjacent rail 25 while the other slipper of the pair slides against the opposite side of the rail. The slippers thus allow the cope flask 20 to slide vertically but captivate the flask against lateral movement so as to keep the flask in vertical alinement with the drag flask 12 and the presser head 21.

Figure 5:
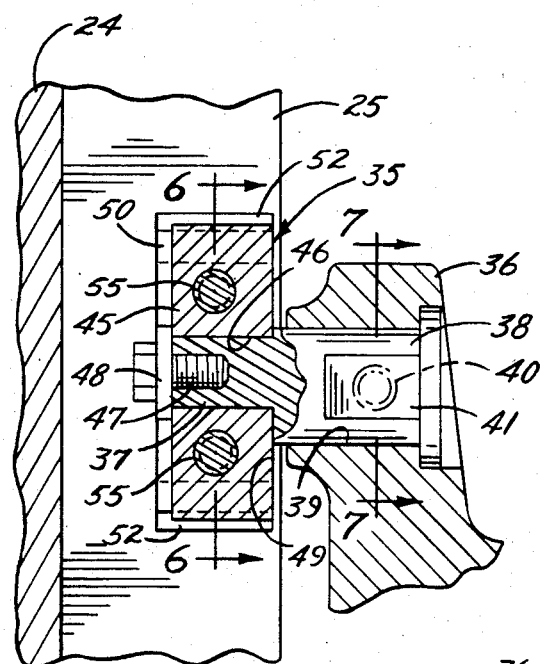
FIG. 5 is an enlarged fragmentary cross-section taken substantially along the line 5—5 of FIG. 3.
Figure 7:
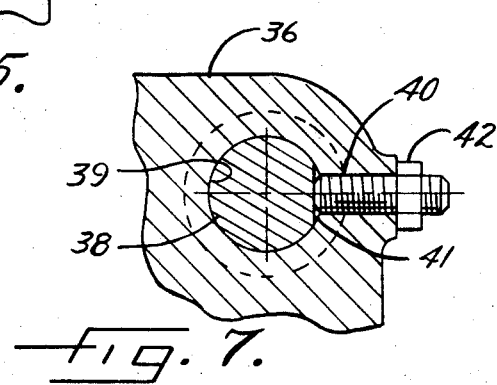
FIGS. 6 and 7 are fragmentary cross-sections taken substantially along the lines 6—6 and 7—7, respectively, of FIG. 5.

The slippers 35 of each pair are supported by a mounting bracket 36 (FIGS. 3 and 5) which is attached to the corner of the cope flask 20. Two mounting shafts 37 project from each mounting bracket and are located on opposite sides of the rail 25. As can be seen in FIGS. 5 and 7, each shaft 37 is integral with an eccentric 38 (for interchangeability with different machines) disposed within a bore 39 in the mounting bracket, with the eccentric 38 locked against rotation in its bore 39 by a set screw 40 (FIG. 7) engaging a flat 41. The set screw is threaded into the mounting bracket 36 and is held by a lock nut 42.

In accordance with the present invention, each slipper 35 is of a unique two-piece construction which enables the slipper to be easily and properly adjusted into face-to-face contact with the rail 25 independently of the mounting shaft 37 and which, in addition, enables the bearing portion of the slipper to be quickly removed and replaced when the bearing portion becomes worn. As a result, there is a significant reduction in the time and effort required to install, adjust and replace the slippers.

More specifically, each slipper 35 includes a mounting member 45 (FIGS. 5 and 6) which herein is a generally rectangular block formed with a central hole 46 for receiving the shaft 37. The mounting block 45 is held captive on the shaft by a washer 48 which overlaps a portion of one side of the mounting member 45 and is held against the end of the shaft 37 by a screw 47 (FIG. 5) which is threaded into the end of the shaft and against the washer. The opposite side of the member 45 is held captive by a shoulder 49 on the shaft 47, the shoulder 47 being located to permit pivoting movement of the member 45 about the shaft 37.

Figure 6:
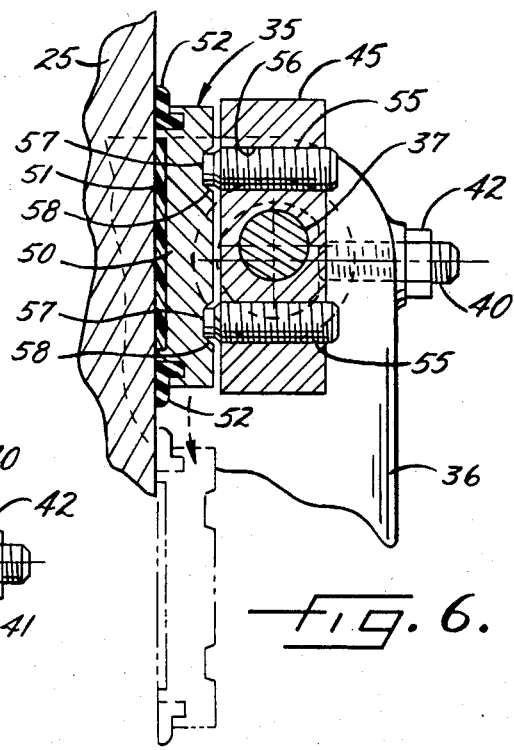

In keeping with the invention, the slipper also includes separate pad member 50 (FIG. 6). Herein, the pad member also is in the form of a generally rectangular block having a width slightly greater than the mounting block 45 (see FIG. 5) and having a thickness equal to about one-half the thickness of the mounting block (see FIG. 6). A strip 51 of tough antifriction material (e.g., "Teflon" impregnated with brass) is bonded to the outer face of the pad 50 and defines the bearing surface which rides along the rail 25. Resiliently yieldable wipers 52 at the upper and lower ends of the pad remove sand from the rail and reduce the possibility of the bearing strip 51 being abraded away by sand as the slipper 35 slides upwardly and downwardly along the rail.

Further in carrying out the invention, two independently adjustable fasteners 55 (FIGS. 5 and 6) secure the pad 50 to the mounting block 45 and enable the pad to be adjusted as necessary to bring the bearing strip 51 into good face-to-face contact with the rail 25. Moreover, the fasteners may be quickly released to enable a worn pad to be easily removed from the mounting block and replaced with a new pad having a new bearing strip 51 and new wipers 52.

Herein, the fasteners 55 simply are in the form of dog-point set screws which are threaded into upper and lower holes 56 (FIG. 6) in the mounting block 45. The reduced-diameter end 57 of each set screw 55 projects into a hole or socket 58 formed in the adjacent face of the pad 50. Thus, the screws captivate the pad for movement with the mounting block during shifting of the cope flask 20. By adjusting the screws toward the pad 50, the bearing strip 51 of the pad may be pressed into tight but sliding contact with the rail 25. A substantially uniform top-to-bottom bearing pressure can be established both initially and as wear occurs by adjusting the screws independently of one another, with the mounting block 45 pivoting about the shaft 37 as the screws are adjusted relative to each other.

It will be recognized that the pad 50 can tilt laterally about an axis passing through the centers of the two screws 55, which are located near the middle of the pad. This axis is perpendicular to the axis of the shaft 37, and thus the slipper 35 is free to pivot about two orthogonal axes to maintain the full face of the pad 50 in contact with the rail 25.

When the bearing strip 51 wears out, the screws 55 are simply loosened to back the dog-points 57 out of the sockets 58 and to free the pad 50 from the mounting block 45. The spacing between the mounting block 45 and the rail 25 is sufficiently greater than the thickness of the pad 50 as is shown most clearly in FIG. 6. Thus, once the screws are loosened, the pad 50 may be slipped downwardly from between the mounting block and the rail as shown in phantom lines in FIG. 6. A new pad then may be slipped upwardly into position and fixed in place by tightening the screws individually until the bearing strip 51 is in full top-to-bottom contact with the rail 25. The removal, installation and adjustment may be accomplished without moving the mounting block 45 or without disturbing the position of the shaft 37.

In FIGS. 8 and 9, slippers 35' which are identical to the slippers 35 are shown in conjunction with the platen 15 to help stabilize the platen during its vertical movement while still permitting the platen to move laterally to some extent. As shown in FIG. 8, the platen is generally rectangular and includes a mounting bracket 60 at each of its four corners. Each mounting bracket carries a shaft 61 (FIG. 9) supporting only a single slipper 35' which rides along only one side of the rail 25. Otherwise, the slipper arrangement of the platen is virtually identical to the slipper arrangement of the cope flask 20.

I claim as my invention:

1. Apparatus for mounting a component of a matchplate molding machine for sliding movement along an elongated rail, said apparatus comprising a mounting member, means for securing said mounting member to said component, a pad member having a flat bearing surface engageable with said rail, and a pair of independently adjustable fasteners extending between said mounting member and said pad member and securing said pad member for movement with said mounting member, said fasteners being adjustable in one direction to force said pad member away from said mounting member and to press said bearing surface into face-to-face contact with said rail, said fasteners being adjustable in the other direction to release said pad member from said mounting member, the clearance between said mounting member and said rail being sufficiently great to enable said pad member to be slipped from between said mounting member and said rail when said fasteners are released and without disturbing the position of said mounting member on said component.

2. Apparatus as defined in claim 1 in which said mounting member and said pad member are generally rectangular blocks, the thickness of said pad member being substantially less than the spacing between said mounting member and said rail.

3. Apparatus as defined in claim 2 in which said fasteners comprise space screws threaded in and extending through said mounting member, spaced holes formed in said pad member, the ends of said screws projecting non-threadably into said holes.

4. Apparatus as defined in claim 3 in which said component is a box-like cope flask having a generally rectangular cross-section.

5. Apparatus as defined in claim 3 in which said component is a vertically movable platen having a generally rectangular shape.

6. Apparatus as defined in claim 1 in which said pad is mounted for pivoting movement about two orthogonal axes to maintain the full face of said pad member in contact with said rail.

7. A matchplate molding machine having a box-like molding flask of generally rectangular cross-section and having guide and support rails located adjacent the corners of the flask, means for mounting said flask for sliding along said rails, said means comprising a pair of slippers located adjacent each of the eight corners of the flask with the slippers of each pair being located on opposite sides of the respective rail, there being a mounting shaft associated with each slipper and secured to said flask adjacent the corner thereof, said machine being characterized in that each of said slippers comprises a mounting block pivotally secured to the respective shaft, a pad having a flat bearing surface contacting said rail, and a pair of independently adjustable fasteners extending between said mounting block and said pad and securing said pad to said mounting block, said fasteners being adjustable in one direction to force said pad away from said mounting block and to press said bearing surface into contact with said rail, said fasteners being adjustable in the other direction to release said pad from said mounting block, the clearance between said mounting block and said rail being sufficiently great to enable said pad to be slipped from between said mounting block and said rail when said fasteners are released and without disturbing the position of said mounting block relative to said shaft and said flask.

8. A matchplate molding machine as defined in claim 7 in which said fasteners comprise spaced screws threaded in and extending through said mounting block, spaced holes formed in said pad, the ends of said screws projecting non-threadably into said holes.

9. Apparatus as defined in claim 7 in which said pad is mounted for pivoting movement about two orthogonal axes to maintain the full face of said pad member in contact with said rail.

10. A matchplate molding machine having a vertically movable drag flask platen of generally rectangular shape and having vertically extending guide rails located adjacent the four corners of the platen, means for mounting said platen for up and down movement on said rails, said means comprising a slipper located adjacent each of the four corners of the platen and on one side of the respective rail, a mounting shaft projecting from each corner of the platen and secured rigidly to the platen, said machine being characterized in that each of said slippers comprises a mounting block pivotally secured to the respective shaft, a pad having a flat bearing surface engageable with said rail, and a pair of independently adjustable fasteners extending between said mounting block and said pad and securing said pad to said mounting block, said fasteners being adjustable in one direction to force said pad away from said mounting block and to press said bearing surface into face-to-face contact with said rail, said fasteners being adjustable in the other direction to release said pad from said mounting block, the clearance between said mounting block and said rail being sufficiently great to enable said pad to be slipped from between said mounting block and said rail when said fasteners are released and without disturbing the position of said mounting block relative to said platen and said shaft.

11. A matchplate molding machine as defined in claim 10 in which said fasteners comprise spaced screws threaded in and extending through said mounting block, spaced holes formed in said pad, the ends of said screws projecting non-threadably into said holes.

12. Apparatus are defined in claim 10 in which said pad is mounted for pivoting movement about two orthogonal axes to maintain the full face of said pad member in contact with said rail.

* * * * *